US012590869B2

(12) United States Patent
Nair et al.

(10) Patent No.: US 12,590,869 B2
(45) Date of Patent: Mar. 31, 2026

(54) SYSTEM, APPARATUS AND METHOD FOR ESTIMATING REMAINING USEFUL LIFE OF AT LEAST ONE BEARING

(71) Applicant: INNOMOTICS GMBH, Nuremberg (DE)

(72) Inventors: P. V. Sudev Nair, Bangalore (IN); Vincent Malik, Munich (DE); Christian Andreas Wolf Pozzo, Zirndorf (DE); Iniyan Ramasamy, Chennai (IN)

(73) Assignee: INNOMOTICS GMBH, Nuremberg (DE)

( * ) Notice: Subject to any disclaimer, the term of this patent is extended or adjusted under 35 U.S.C. 154(b) by 397 days.

(21) Appl. No.: 18/266,968

(22) PCT Filed: Dec. 10, 2021

(86) PCT No.: PCT/EP2021/085152
§ 371 (c)(1),
(2) Date: Jun. 13, 2023

(87) PCT Pub. No.: WO2022/128769
PCT Pub. Date: Jun. 23, 2022

(65) Prior Publication Data
US 2024/0060855 A1 Feb. 22, 2024

(30) Foreign Application Priority Data
Dec. 14, 2020 (EP) .................................... 20213836

(51) Int. Cl.
*G01M 13/045* (2019.01)
*F16C 19/52* (2006.01)

(52) U.S. Cl.
CPC ......... *G01M 13/045* (2013.01); *F16C 19/527* (2013.01); *F16C 2233/00* (2013.01)

(58) Field of Classification Search
USPC .......................................................... 73/593
See application file for complete search history.

(56) References Cited

U.S. PATENT DOCUMENTS 6,199,018 B1 * 3/2001 Quist ................. G05B 23/0221
706/912
9,903,787 B2 * 2/2018 Cerny .................... F01D 19/00
(Continued)

OTHER PUBLICATIONS

International Search Report & Written Opinion for PCT/EP2021/085152 mailed on Mar. 21, 2022.

*Primary Examiner* — Walter L Lindsay, Jr.
*Assistant Examiner* — Warren K Fenwick
(74) *Attorney, Agent, or Firm* — Schmeiser, Olsen & Watts, LLP

(57) ABSTRACT

A system, apparatus and method for estimating remaining useful life of at least one bearing is provided. The method includes receiving request for analyzing defect in bearing from source, determining vibration spectrum of bearing from the received operational data, monitoring an impact of defect on one bearing over a period of time based on the determined vibration spectrum, determining characteristic values from the vibration spectrum for which the impact of the defect on the bearing is above a threshold range, determining impact force during an operation of the at least one bearing based on the determined characteristic values and one or more parameters obtained from a virtual bearing model, determining remaining useful life of the bearing based on the determined impact force during the time period and generating a notification indicating the remaining useful life of the bearing on output device.

14 Claims, 14 Drawing Sheets

(56) References Cited

U.S. PATENT DOCUMENTS

| | | | |
|---|---|---|---|
| 10,436,766 B1 * | 10/2019 | Bayyouk | F04B 17/05 |
| 2008/0234964 A1 * | 9/2008 | Miyasaka | G01M 13/04 |
| | | | 702/113 |
| 2012/0239716 A1 * | 9/2012 | Murray | F16C 41/008 |
| | | | 708/160 |
| 2024/0393210 A1 * | 11/2024 | Nair | G01M 13/04 |
| 2025/0216294 A1 * | 7/2025 | Nair | G01M 13/04 |

* cited by examiner

| | | |
|---|---|---|
| Enter outer race radius in mm | XX | |
| Enter radius of the ball in mm | XX | Calculate force |
| Enter the angular velocity in rpm | XX | |
| Enter the load in newtons | XX | Calculate peak |
| Enter the pitch radius in mm | XX | |
| Number of balls in bearing | XX | Calculate RUL |
| defect size in mm | X | |

| | |
|---|---|
| Peak amplitude | XX |
| Force in N | XX |
| RUL in hours | XX |

1000

SYSTEM, APPARATUS AND METHOD FOR ESTIMATING REMAINING USEFUL LIFE OF AT LEAST ONE BEARING

CROSS-REFERENCE TO RELATED APPLICATIONS

This application claims priority to PCT Application No. PCT/EP2021/085152, having a filing date of Dec. 10, 2021, which claims priority to EP Application No. 20213836.8, having a filing date of Dec. 14, 2020, the entire contents all of which are hereby incorporated by reference.

FIELD OF TECHNOLOGY

The following relates to a field of bearing monitoring systems and more particularly relates to estimating remaining useful life of at least one bearing.

BACKGROUND

Bearings are used in several machinery in an industry for the purpose of reducing friction between two rotating parts. These bearings also restrict relative motion between the rotating parts to a desired motion. However, bearings may fail unexpectedly due to factors such as poor lubrication and contamination within a structure of the bearing. For example, lubrication within the bearing may fail during an operational phase of the bearing due to excessive temperatures. Contamination may occur due to entry of foreign particles, moisture etc. into the structure of the bearing. The above factors lead to failure modes such as corrosion, spalling, pitting, electrical erosion, plastic deformation and the like, in the bearing. As a result, an expected fatigue life of the bearing assembly is reduced and eventually failures occur. Consequently, bearing failures may cause unexpected downtime of the machinery, resulting in production and financial loss. In safety-critical applications, bearing failures may also put human lives at risk. In light of the above, there exists a need for estimating remaining useful life of a bearing.

SUMMARY

An aspect relates to a system, apparatus and method for estimating remaining useful life of at least one bearing.

The aspect of embodiments of the present invention is achieved by a method for estimating remaining useful life of at least one bearing.

In embodiments, the method comprises receiving a request for analyzing a defect in the at least one bearing. The term 'defect' as used herein refers to any structural deformities within the at least one bearing that result in abnormal operation of the bearing. The request comprises operational data associated with the at least one bearing. In one embodiment, the operational data comprises an output of at least one sensing unit associated with the bearing in real-time. It must be understood that the term 'sensing unit' as used herein includes both transducers and sensors. In addition to the above, the request may also specify one or more bearing parameters.

In an embodiment, the present invention facilitates estimation of remaining useful life of bearings of any size based on the respective operational data.

In embodiments, the method comprises determining vibration spectrum of the at least one bearing from the received operational data. Advantageously, the conversion of the operational data from time domain to frequency domain helps in enveloping the signal and protects from the unnecessary vibrations that are caused by the sources from external physical factors. Furthermore, the determination of remaining useful life of the at least one bearing based on the vibration spectrum improves accuracy and In embodiments, the method comprises monitoring an impact of the defect on the at least one bearing over a period of time based on the determined vibration spectrum. The term 'impact' as used herein refers to deviations from a normal operation of the bearing resulting from the defect. In an embodiment, in monitoring the impact of the defect, the method comprises monitoring anomalies in the output of the at least one sensing unit.

In an embodiment, the present invention facilitates continuous monitoring of impacts due to defects in a bearing in real-time.

In embodiments, the method comprises determining one or more characteristic values from the vibration spectrum for which the impact of the defect on the bearing is above a threshold range. In an example, determining the one or more characteristic values comprises analyzing the operational data associated with the at least one bearing.

In embodiments, the method comprises determining an impact force during an operation of the at least one bearing based on the determined one or more characteristic values and one or more parameters obtained from a virtual bearing model. The term 'impact force' as used herein refers to a contact force or maximum compression force experienced by the ball upon entering an edge of the defect.

In an embodiment, determining an impact force during an operation of the at least one bearing comprises generating the virtual bearing model for a group of bearings comparable with the at least one bearing.

In an embodiment, generating the virtual bearing model comprises determining test operation profiles based on test operation data associated with the group of bearings. Further, the method comprises simulating the predetermined defects on a predefined bearing model comprising dataset pursuant to dynamic load rating standards and rating life standards associated with the group of bearings. Further, in embodiments, the method comprises generating simulated operation profiles in frequency domain associated with the group of bearings based on the simulation of the predetermined defects on the predefined bearing model.

In an embodiment, determining the impact force during an operation of the at least one bearing comprises determining calibrated impact force for the group of bearings based on a correlation model obtained from frequency spectrum of simulation vibration signals and the generated simulated operation profiles in frequency domain associated with the group of bearings.

In an embodiment, the virtual bearing model is generated based on one or more of simulation data, experimental data and mathematical data associated with the group of bearings.

In an embodiment, determining the impact force further comprises optimizing the one or more parameters in the determined calibrated impact force for the group of bearings using a machine learning model.

In an embodiment, determining the impact force further comprises determining dynamic parameter for the at least one bearing based on the one or more parameters determined for each of the bearings in the group of bearings.

In an embodiment, the present invention uses impact force during the time period to obtain remaining useful life of the bearing.

In embodiments, the method comprises determining the remaining useful life of the at least one bearing based on the impact force and the operational data during the time period. The term 'remaining useful life' as used herein, refers to a duration between initiation of a detectable failure mode and a functional failure of the bearing. In an embodiment, in determining the remaining useful life, the method comprises computing a dynamic parameter associated with the bearing based on the impact force using the virtual model of the bearing. In one embodiment, the dynamic parameter is a dynamic equivalent load on the bearing.

Further, a remaining useful life model of the bearing is configured based on the dynamic parameter. The remaining useful life model is a dynamic model that relates the dynamic parameter to a life of the bearing. Further, the remaining useful life of the bearing is computed based on the configured remaining useful life model and the operational data.

In an embodiment, the present invention facilitates use of impact force to determine a dynamic parameter that influences degradation of the bearing.

In embodiments, the method comprises generating a notification indicating the remaining useful life of the bearing on an output device. In addition to the remaining useful life, the notification may further include diagnostic information associated with the bearing. For example, the diagnostic information may indicate the impact force curve, the RUL curve, time and spectral domain velocity curves, and an indication of the state of degradation on the RUL curve.

The aspect of embodiments of the present invention is achieved by an apparatus for estimating remaining useful life of a bearing. The apparatus comprises one or more processing units, and a memory unit communicatively coupled to the one or more processing units. The memory unit comprises a bearing management module stored in the form of machine-readable instructions executable by the one or more processing units. The bearing management module is configured to perform method steps described above. The execution of the condition management module may also be performed using co-processors such as Graphical Processing Unit (GPU), Field Programmable Gate Array (FPGA) or Neural Processing/Compute Engines.

According to an embodiment of the present invention, the apparatus can be an edge computing device. As used herein "edge computing" refers to computing environment that is capable of being performed on an edge device (e.g., connected to sensing units in an industrial setup and one end and to a remote server(s) such as for computing server(s) or cloud computing server(s) on other end), which may be a compact computing device that has a small form factor and resource constraints in terms of computing power. A network of the edge computing devices can also be used to implement the apparatus. Such a network of edge computing devices is referred to as a fog network.

In another embodiment, the apparatus is a cloud computing system having a cloud computing based platform configured to provide a cloud service for analyzing defects in a bearing. As used herein, "cloud computing" refers to a processing environment comprising configurable computing physical and logical resources, for example, networks, servers, storage, applications, services, etc., and data distributed over the network, for example, the internet. The cloud computing platform may be implemented as a service for analyzing defects in a bearing. In other words, the cloud computing system provides on-demand network access to a shared pool of the configurable computing physical and logical resources. The network is, for example, a wired network, a wireless network, a communication network, or a network formed from any combination of these networks.

Additionally, the aspect of embodiments of the present invention are achieved by a system for estimating remaining useful life of a bearing. The system comprises one or more sources capable of providing operational data associated with a bearing and an apparatus as described above, communicatively coupled to the one or more sources. The term 'sources' as used herein, refer to electronic devices configured to obtain and transmit the operational data to the apparatus. Non-limiting examples of sources include sensing units, controllers and edge devices.

The aspect of embodiments of the present invention are also achieved by a computer-readable medium, on which program code sections of a computer program product (non-transitory computer readable storage medium having instructions, which when executed by a processor, perform actions) are saved, the program code sections being loadable into and/or executable by a processor which performs the method as described above when the program code sections are executed.

BRIEF DESCRIPTION

Some of the embodiments will be described in detail, with reference to the following figures, wherein like designations denote like members, wherein:

FIG. 6 is an exemplary web-based interface that enables a user to provide values for the one or more bearing parameters from a client device, in accordance with an embodiment of the present invention;

FIG. 7 is a Graphical User Interface view showing an example of determined output, in accordance with an embodiment of the present invention;

DETAILED DESCRIPTION

Figure 1A:
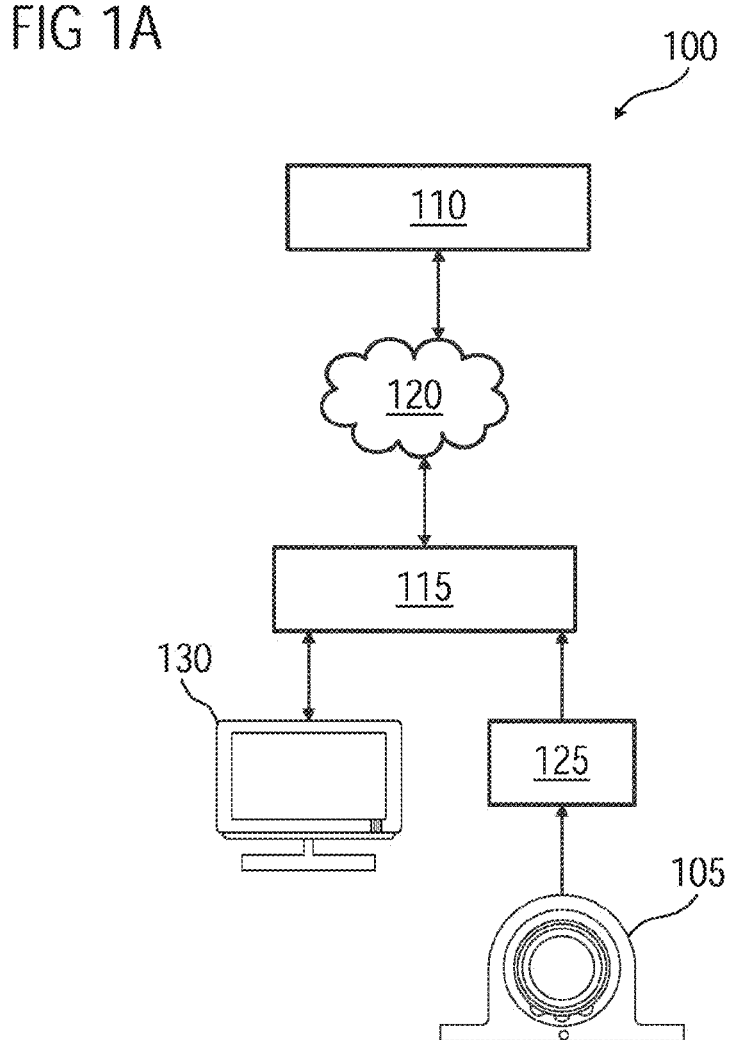
FIG. 1A illustrates a block-diagram of a system for estimating remaining useful life of at least one bearing, in accordance with an embodiment of the present invention.

FIG. 1A illustrates a block-diagram of a system 100 for estimating remaining useful life of a bearing 105, in accordance with an embodiment of the present invention. For example, the bearing 105 may be part of a rotating equipment such as an industrial motor (not shown). Non-limiting examples of bearings include deep groove ball bearings, cylindrical roller bearings, a tapered roller bearing, thrust bearing, angular contact ball bearing, needle ball bearing and the like. In the present embodiment, the bearing 105 comprises an inner race, an outer race and a plurality of rolling elements disposed in a gap between the inner race and the outer race. The bearing 105 further comprises a cage positioned between the inner race and the outer race for maintaining a symmetric radial gap between the rolling elements. An example of a bearing is described later in the present disclosure with reference to FIG. 2A.

The system 100 comprises an apparatus 110 communicatively coupled to one or more edge devices 115. The one or more edge devices 115 are connected to the apparatus 110 via a network 120, for example, local area network (LAN), wide area network (WAN), WiFi, etc. Each of the edge devices 115 is configured to receive sensor data from at least one sensing unit 125 associated with the bearing 105. The at least one sensing unit 125 may include, for example, a vibration sensor, a velocity sensor, an acceleration sensor and a force sensor. The sensor data corresponds to an output of the at least one sensing unit 125. For example, the output from the at least one sensing unit 125 may be in the form of vibration data, velocity data, acceleration data or force data. In an embodiment, the sensor data are obtained through data acquisition interfaces on the edge device 115. The edge device 115 provides the sensor data in real-time to the apparatus 110.

In addition, the edge device 115 is also configured to provide one or more bearing parameters associated with the bearing 105 to the apparatus 110. The one or more bearing parameters include, but are not limited to, a standard bearing number, a ball size, bearing static load, density of material, angular velocity, internal clearance, bearing diameter, number of rolling elements, radius of rolling element, diameter of inner race, diameter of outer race, defect size, fatigue load limit, and type of lubricant used in the bearing 105. It must be understood that the standard bearing number is indicative of certain specifications such as a ball size, bearing static load, density of material, internal clearance, bearing diameter, number of rolling elements, radius of rolling element, diameter of inner race, diameter of outer race, fatigue load limit, bearing width and the like, as provided by a manufacturer of the bearing 105. Therefore, in an embodiment, the standard bearing number associated with the bearing 105 may be provided in place of the above bearing parameters.

The one or more bearing parameters may be stored in a memory of the edge device 115 or may be input to the edge device 115 by an operator. For example, the edge device 115 may be communicatively coupled to a client device 130. Non-limiting examples of client devices include, personal computers, workstations, personal digital assistants, human machine interfaces. The client device 130 may enable the user to input values for the one or more bearing parameters through a web-based interface. Upon receiving the one or more bearing parameters from the user, the edge device 115 transmits a request for analyzing a defect in the bearing 105 to the apparatus 110. The defects occur due to initiation of a failure mode in the bearing 105. Non-limiting examples of failure modes include spalling, pitting, plastic deformation, abrasion, electrical erosion and corrosion typically on an outer race of the bearing 105. The defects may occur due to presence of contaminants or due to properties of a lubricant used within the bearing 105. The request comprises the one or more bearing parameters along with the sensor data.

Figure 1B:
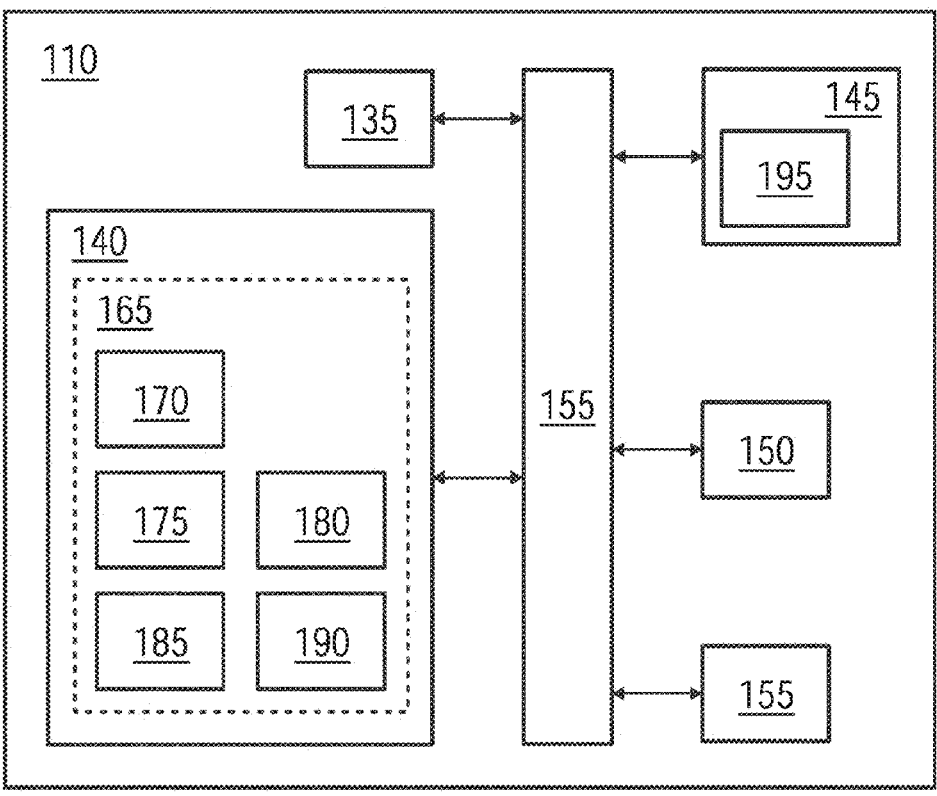
FIG. 1B illustrates a block-diagram of an apparatus for estimating remaining useful life of at least one bearing, in accordance with an embodiment of the present invention.

In the present embodiment, the apparatus 110 is deployed in a cloud computing environment. As used herein, "cloud computing environment" refers to a processing environment comprising configurable computing physical and logical resources, for example, networks, servers, storage, applications, services, etc., and data distributed over the network 120, for example, the internet. The cloud computing environment provides on-demand network access to a shared pool of the configurable computing physical and logical resources. The apparatus 110 may include a module that estimates remaining useful life of a given bearing based on the corresponding sensor data and the one or more bearing parameters. Additionally, the apparatus 110 may include a network interface for communicating with the one or more edge devices 115 via the network 120. The apparatus 110 comprises a processing unit 135, a memory unit 140, a storage unit 145, a communication unit 150, the network interface 155 and a standard interface or bus 160, as shown in FIG. 1B. The apparatus 110 can be a computer, a workstation, a virtual machine running on host hardware, a microcontroller, or an integrated circuit. As an alternative, the apparatus 110 can be a real or a virtual group of computers (the technical term for a real group of computers is "cluster", the technical term for a virtual group of computers is "cloud").

The term 'processing unit' 135, as used herein, means any type of computational circuit, such as, but not limited to, a microprocessor, microcontroller, complex instruction set computing microprocessor, reduced instruction set computing microprocessor, very long instruction word microprocessor, explicitly parallel instruction computing microprocessor, graphics processor, digital signal processor, or any other type of processing circuit. The processing unit 135 may also include embedded controllers, such as generic or programmable logic devices or arrays, application specific integrated circuits, single-chip computers, and the like. In general, a processing unit 135 may comprise hardware elements and software elements. The processing unit 135 can be configured for multi-threading, i.e., the processing unit 135 may host different calculation processes at the same time, executing either in parallel or switching between active and passive calculation processes.

The memory unit 140 may be volatile memory and non-volatile memory. The memory unit 140 may be coupled for communication with the processing unit 135. The processing unit 135 may execute instructions and/or code stored in the memory unit 140. A variety of computer-readable storage media may be stored in and accessed from the memory unit 140. The memory unit 140 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like.

The memory unit 140 comprises a bearing management module 165 in the form of machine-readable instructions on any of the above-mentioned storage media and may be in communication to and executed by the processing unit 135. The bearing management module 165 comprises a preprocessing module 170, an impact monitoring module 175, an impact force computation module 180, a life estimation module 185 and a notification module 190. The preprocessing module 170 is configured for receiving a request for analyzing a defect in the bearing 105. The request comprises the operational data associated with the bearing 105 and the one or more bearing parameters. The preprocessing module 170 is configured for determining vibration spectrum of the at least one bearing from the received operational data. The impact monitoring module 175 is configured for monitoring an impact of the defect on the bearing 105 over a period of time. The impact monitoring module 175 is further configured for determining one or more frequencies from the vibration spectrum for which the impact of the defect on the bearing is above a threshold range.

The impact force computation module 180 is configured for determining an impact force during an operation of the at least one bearing based on the determined one or more frequencies and one or more parameters obtained from the virtual bearing model. The life estimation module 185 is configured for determining a remaining useful life of the bearing 105 based on the impact force and the operational data during the time period. The notification module 190 is configured for generating a notification indicating the remaining useful life of the bearing 105 on an output device. In the present embodiment, the output device may be the client device 130.

The storage unit 145 comprises a non-volatile memory which stores default bearing parameters associated with standard bearing numbers. The storage unit 145 includes a database 195 that comprises default values of bearing parameters and one or more look-up tables comprising predetermined values for factors that vary with operating conditions of the bearing 105. The bus 160 acts as interconnect between the processing unit 135, the memory unit 140, the storage unit, and the network interface 155. The communication unit 150 enables the apparatus 110 to receive requests from the one or more edge devices 115. The communication module may support different standard communication protocols such as Transport Control Protocol/Internet Protocol (TCP/IP), Profinet, Profibus, and Internet Protocol Version (IPv).

Those of ordinary skilled in the conventional art will appreciate that the hardware depicted in FIGS. 1A and 1B may vary for different implementations. For example, other peripheral devices such as an optical disk drive and the like, Local Area Network (LAN)/Wide Area Network (WAN)/Wireless (e.g., Wi-Fi) adapter, graphics adapter, disk controller, input/output (I/O) adapter, network connectivity devices also may be used in addition or in place of the hardware depicted. The depicted example is provided for the purpose of explanation only and is not meant to imply architectural limitations with respect to the present disclosure.

Figure 2A:
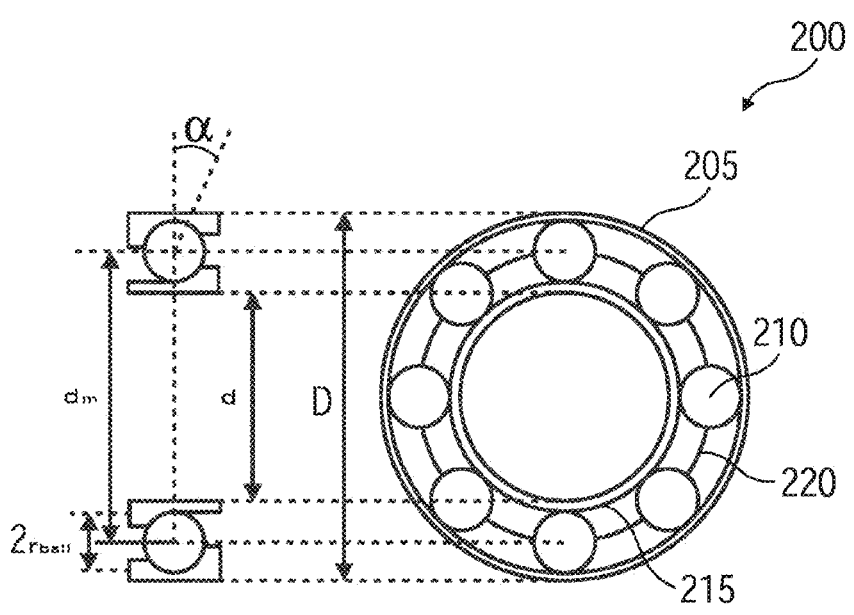
FIG. 2A illustrates structure of a ball bearing.
Figure 2B:
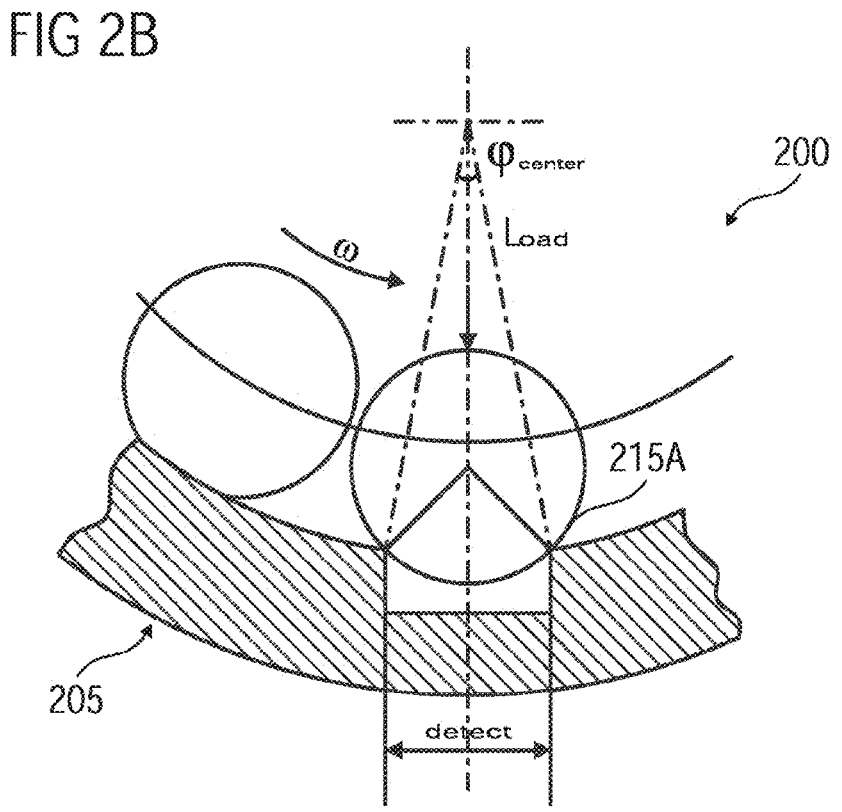
FIG. 2B illustrates a defect in an outer race of the ball bearing.

FIG. 2A illustrates structure of a ball bearing 200. The ball bearing 200 comprises an outer race 210 of diameter D, a plurality of balls 215 each of radius man, a cage 220 and an inner race 225 of diameter d. The plurality of balls 215 are disposed in a gap between the outer race 210 and the inner race 225. The cage 220 maintains a symmetric radial spacing between the balls 215. FIG. 2B illustrates a defect of defect size defect on a wall of the outer race 210 in contact with the balls 210. In the present example, the defect is an indentation in the outercase due to pitting. The defect size may be defined as a distance travelled by a ball of the ball bearing 200 between entering and leaving the defect. The defect subtends an angle 9 center at the center of a ball 215A among the plurality of balls 215 as shown. The angular velocity of a shaft on which the ball bearing 200 is mounted, is indicated as co.

Figure 3:
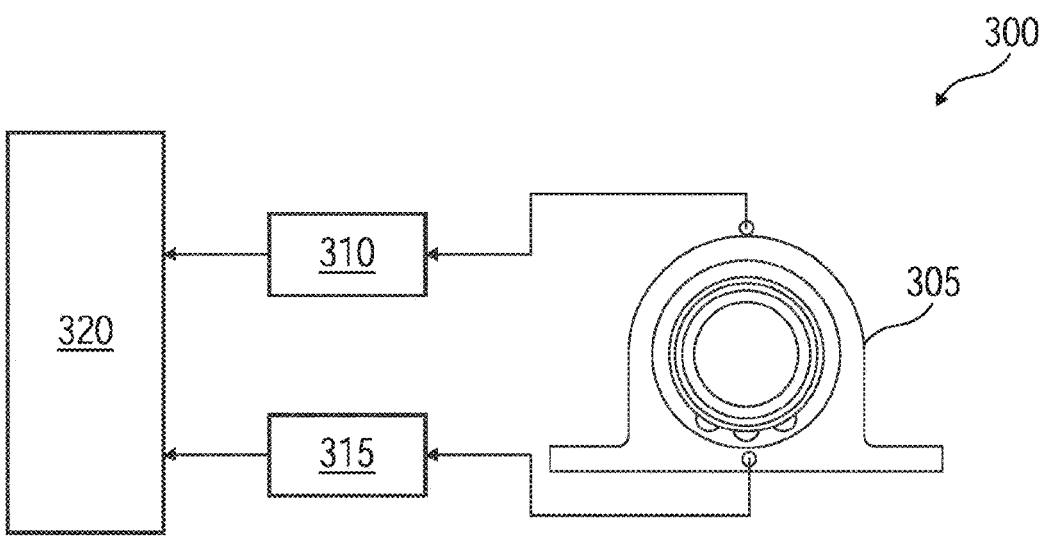
FIG. 3 illustrates an experimental test set-up for building a virtual model of a bearing, in accordance with an embodiment of the present invention.

FIG. 3 illustrates an experimental test set-up 300 for building a virtual model of a bearing, in accordance with an embodiment of the present invention. In the present embodiment, the virtual model corresponds to ball bearings. It must be understood by a person skilled in the conventional art that the virtual model may be built for other types of bearings in a similar manner.

The virtual model may be based on one or more of physics-based models, Computer-Aided Design (CAD) models, Computer-Aided Engineering (CAE) models, one-dimensional (1D) models, two-dimensional (2D) models, three-dimensional (3D) models, finite-element (FE) models, descriptive models, metamodels, stochastic models, parametric models, reduced-order models, statistical models, heuristic models, prediction models, ageing models, machine learning models, Artificial Intelligence models, deep learning models, system models, surrogate models and the like.

In the present embodiment, the virtual model is built based on test operation data such as simulation data, experimental data and mathematical data associated with a plurality of bearings under a plurality of operating conditions. The plurality of operating conditions may be generated based on a Design Of Experiments (DOE) for varying values of load, angular velocity and defect size. Here, the term 'load' indicates bearing static load. For example, the defect size may be selected as one of 0.1 mm, 0.2 mm, 1 mm, 2 mm, 3 mm, 4 mm and 5 mm. The load may be one of 400 N and 500 N. The angular velocity may be one of 1000 rad/s, 1200 rad/s, 1400 rad/s and 1600 rad/s. In the present embodiment, simulation data, experimental data and mathematical data associated with a group of bearings comprising three standard ball bearings are used. For example, a first bearing among the three bearings may have a standard bearing number 6205, a second bearing may have a standard bearing number 6213 and a third bearing may have a standard bearing number 6319.

The experimental set-up 300 comprises a bearing 305, at least one force sensor 310 and at least one vibration sensor 315 attached to the bearing 305. The force sensor 310 and the vibration sensor 315 are communicatively coupled to an apparatus 320, similar to the apparatus 110. In an embodiment, the apparatus 320 may include a data acquisition interface for receiving signals from the force sensor 310 and the vibration sensor 315. The bearing 305 is mounted on a rotating shaft. In an example, the rotating shaft is part of a rotating equipment. Further, one or more defects are artificially introduced into an outer race of the bearing 305. Each of the defects is associated with a known defect size as specified in the operating conditions. The force sensor 310 is configured to measure an impact force resulting from a ball of the bearing passing through the defect. The term 'impact force' as used herein refers to a contact force experienced by the ball upon entering an edge of the defect. In an example, the force sensor 310 is a triaxial piezoelectric crystal. The vibration sensor 315 is configured to measure vibrations or acceleration values resulting from the ball passing through the defect. In an example, the vibration sensor 315 is an accelerometer. Further, the test or experimental data is recorded. The test operation data comprises the impact force measured by the force sensor 310 and respective acceleration values measured by the vibration sensor 315 for each of the operating conditions. Similarly, the experimental data corresponding to each of the three bearings are recorded.

The simulation data is generated by simulating a behaviour of the bearings based on a multi-physics simulation model. The operating conditions may be provided as inputs to the multiphysics simulation model in a simulation environment. For example, the simulation environment may be provided by a computer-aided simulation tool on the apparatus 320. The simulation model comprises Finite-Element models of an outer race, a cage, a plurality of rolling elements, an inner race and a shield associated with the bearing. In the present example, the rolling elements are balls.

Further, the simulation model corresponding to each of the standard ball bearings is configured to model a defect in the outer race of a defect size specified in the operating conditions. For example, the defect may be associated with one of spalling, pitting, plastic deformation, abrasion, electrical erosion or corrosion or a combination thereof.

Based on the configured simulation model, simulation instances are generated. The simulation instances are executed in the simulation environment to generate the simulation data for the bearing corresponding to each of the simulation data is generated for the same operating conditions that were used for generating the test operational data. The simulation data comprises values of simulated maximum impact force corresponding to each of the operating conditions. Similarly, simulation data is generated for each of the three bearings.

The apparatus 320 further builds the virtual model of the bearing based on the simulation data, the experimental data and the mathematical data. In one embodiment, the virtual model is a surrogate model. The virtual model is further validated based on test data generated using the experimental set up 300. The test data comprises a set of operating conditions of the bearing comprising known values of defect size, angular velocity and load. The output of the force sensor is compared to the output of the virtual model in order to detect an error associated with the virtual model. Further, parameters of the virtual model are tuned in order to minimize the error. The tuned virtual model may be used to predict the maximum impact force associated with any bearing for any given set of operating conditions.

Figure 5:
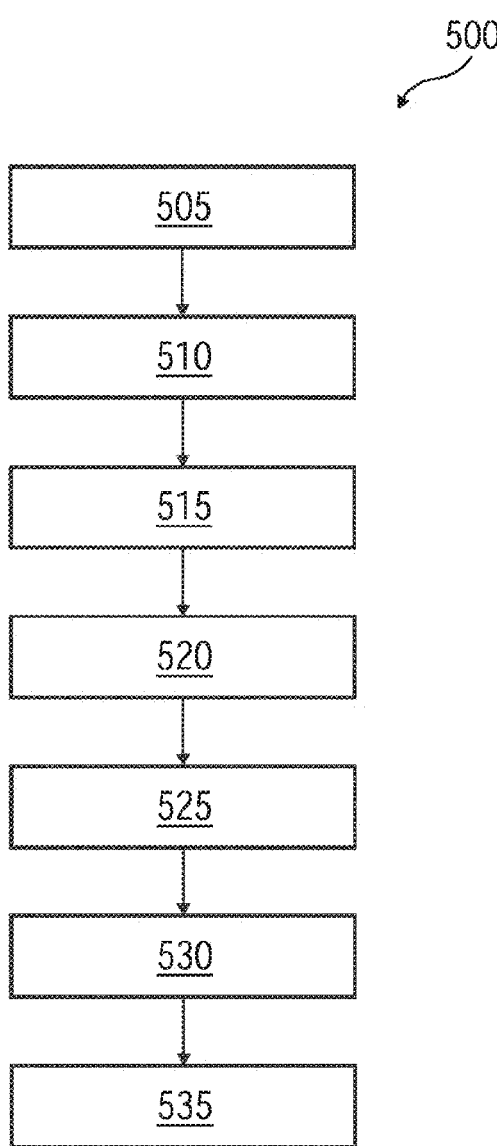
FIG. 5 depicts a flowchart of a method for estimating remaining useful life of the bearing, in accordance with an embodiment of the present invention.

FIG. 5 depicts a flowchart of a method 500 for estimating remaining useful life of a bearing, in accordance with an embodiment of the present invention.

At step 505, a request for analyzing a defect in the bearing is received, by the processing unit 135. The request comprises one or more bearing parameters associated with the bearing received from a client device, similar to client device 130, along with sensor data received from at least one sensing unit attached to the bearing. The sensor data may comprise output of the at least one sensing unit associated with the bearing. Both the client device and the at least one sensing unit are communicatively coupled to an edge device, similar to edge device 115. In the present embodiment, the at least one sensing unit comprises an accelerometer mounted on a bearing housing associated with the bearing. The output of the at least one sensing unit is an acceleration signal in time domain.

In an implementation, a user may initiate the request by providing the one or more bearing parameters through a web-based interface provided on the client device. For example, the one or more bearing parameters include ball radius, bearing static load, density of material, angular velocity, defect size and internal clearance. FIG. 6 illustrates an exemplary web-based interface 600 that enables a user to provide values for the one or more bearing parameters from the client device, in accordance with an embodiment of the present invention.

In one embodiment, one or more of the bearing parameters are specified through a standard bearing number based on an international standard such as ISO dimensional series. For example, if the standard bearing number is 6213, the size of the bearing in mm is 65×120×23, where 65 mm is a diameter of the inner race, 120 mm is a diameter of the outer race and 23 mm is a width of the bearing. The web-based interface may provide a drop-down menu for selecting a bearing number from a plurality of bearing numbers. In the present example, the bearing number may be selected as 6319.

Based on the bearing number, dimensions such as the ball radius and the bearing diameter may be automatically populated on the web-based interface. Similarly, the web-based interface may also provide the user an option to manually enter the bearing parameters, if the bearing number is not displayed in the drop-down menu. Further, the user may confirm the values of the one or more bearing parameters by pressing a 'submit' button on the web-based interface to initiate the request. In an embodiment, the sensor data corresponds to real-time operating conditions of the bearing.

Figure 4A:
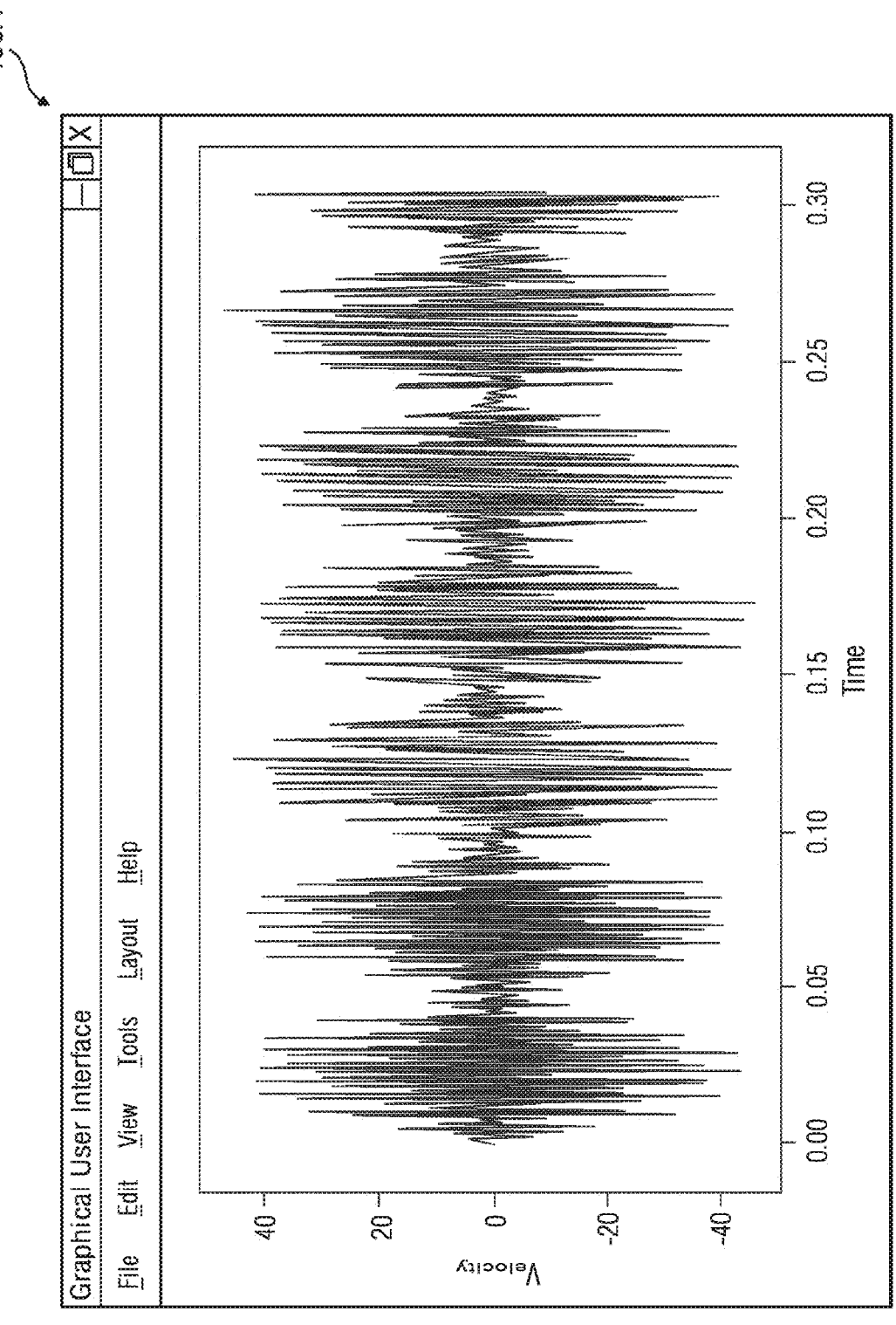
FIG. 4A is a Graphical User Interface view showing an example time-velocity curve of the operational data obtained from the sensing unit, in accordance with an embodiment of the present invention.

At step 510, vibration spectrum of the at least one bearing is determined from the received operational data. The operational data as received from the sensing unit 125 is in time domain. In an embodiment, the ball velocity is obtained from the vibration sensor 315 and represented in time domain. FIG. 4A is a Graphical User Interface view 400A showing an example time-velocity curve of the operational data obtained from the sensing unit 125, in accordance with an embodiment of the present invention. The time domain vibration signals are converted into frequency domain using signal processing techniques such as fourier transform, fast fourier transform (FFT), continuous wavelet transform (CWT), discrete wavelet transform (DWT), and the like.

In an example, the continuous wavelet transform is given by:

$$X(a, b) = \frac{1}{a^{1/2}} \int_{-\infty}^{\infty} x(t)\varphi\left(\frac{t-b}{a}\right) \cdot dt \qquad (1)$$

In particular, the time domain vibration signals are converted into frequency domain using Hilbert transform.

In an example, the Hilbert transform of a signal u(t) is given by:

$$H(u)(t) = \frac{1}{\pi} p.v. \int_{-\infty}^{\infty} \frac{u(T)}{t-T} \cdot dT \qquad (2)$$

The Hilbert transform helps in enveloping the signal and protects the signal from unnecessary vibrations that are caused by the setup or sources from external physical factors.

At step 515, an impact of the defect on the bearing over a period of time is monitored. The impact of the defect is monitored based on anomalies present within the sensor data. The anomalies may be indicated by features of signals generated by the at least one sensing unit. The features may include, but are not limited to, amplitude, frequency, harmonics, spectral energy, RMS velocity, presence of shock pulses or transients, repetitive pulses, and the like. In the present embodiment, the sensor data comprises vibration signal in time-domain which is converted into frequency domain. The impact may be identified from the vibration signal using kurtosis analysis. More specifically, kurtosis of the enveloped signal at different time intervals is performed to find the band with the highest noise signal. In an example, the kurtosis of the signal is performed using the following mathematical relation:

$$Kurt[X] = E\left(\frac{X-\mu}{\sigma}\right)^4 = \frac{E\left[(X-\mu)^4\right]}{\left(E\left[(X-\mu)^2\right]\right)^4} = \frac{\mu_4}{\sigma^4} \tag{3}$$

Figure 4B:
FIG. 4B is a Graphical User Interface view showing peak amplitudes values when signal is passed through bandpass filter, in accordance with an embodiment of the present invention.

Subsequent to kurtosis analysis, a bandpass filter is applied to the signal to filter out the noise signal. The resulting signal is represented in FIG. 4B. FIG. 4B is a Graphical User Interface view 400B showing peak amplitudes values when signal is passed through bandpass filter, in accordance with an embodiment of the present invention.

In an example, amplitude of the filtered signal may indicate periodic impacts of the defect. Upon identifying presence of such an impact, step 520 is performed.

At step 520, one or more characteristic values are determined from the vibration spectrum for which the impact of the defect on the bearing is above a threshold range. The one or more characteristic values are indicative of impacts caused by the defects in the defined time period. More specifically, the one or more characteristic values indicate the values for which the rolling element has high impact caused by the defect. In an embodiment, the characteristics values may be peak amplitude values of velocity signal, peak amplitude values of acceleration signal, or peak amplitude values of displacement signal as obtained from the operation data. The threshold range may be predefined by the operator or may be based on specifications provided by a manufacturer of the bearing. For example, the threshold value may be defined as 2 mm/s. Based on an outcome of the envelope analysis, if the amplitude of the velocity signal crosses the threshold value, then the time period during which the amplitude of the amplitude of the envelope is greater than 2 mm/s is identified.

At step 525, an impact force is determined during an operation of the at least one bearing based on the determined one or characteristic values and one or more parameters obtained from a virtual bearing model. The term 'impact force' as used herein refers to a contact force or maximum compression force experienced by the ball upon entering an edge of the defect. The impact force for the at least one bearing for the requested defect is determined from for the one or more determined characteristic values. The impact force relation comprises dynamic parameter that impacts the remaining useful life of the bearing. The dynamic parameter is determined based on determined one or more parameters obtained for each bearing in the group of bearings i.e., the three standard bearings.

In an embodiment, determining an impact force comprises generating the virtual bearing model for a group of bearings comparable with the at least one bearing. The group of bearings comprises three standard bearings as aforementioned. In an embodiment, the virtual bearing model is a hybrid model generated based on one or more of simulation data, experimental data and mathematical data associated with the group of bearings. In an embodiment, generating the virtual bearing model comprises determining test operation profiles based on test operation data associated with the group of bearings. Further, in embodiments, the method comprises simulating the predetermined defects on a predefined bearing model comprising dataset pursuant to dynamic load rating standards and rating life standards associated with the group of bearings. Further, in embodiments, the method comprises generating simulated operation profiles in frequency domain associated with the group of bearings based on the simulation of the predetermined defects on the predefined bearing model. The simulated operation profiles are generated by transforming the simulated data into frequency domain. The simulated operation profiles in frequency spectrum is used to determined simulated impact force for the group of bearings. Subsequently, calibrated impact force is determined from the simulated impact force.

In an embodiment, determining the impact force comprises determining calibrated impact force for the group of bearings based on a correlation model obtained from velocity spectrum of vibration signals and the generated simulated operation profiles in frequency domain associated with the group of bearings. Furthermore, the correlation model is generated from the velocity spectrum of the vibration signals and force on the bearing. The force is calculated from the mathematical relation based on simulated data and various regression models as below:

$$F = kx^{3/2}p^n + ap^2 + bp + c \tag{4}$$

wherein,

F is the force excreted by the ball in the edge of the defect

X is the maximum displacement of the ball bearing on interaction with the defect edge P is the amplitude peak of the frequency spectrum obtained from the vibration signal of the bearing n, a, b, c are the equation constants that are optimized using the simulation data that is obtained from the virtual bearing model.

In an example, the correlation model is a regression model that maps peaks obtained from the frequency spectrum of the simulation vibration signals to the force that is calculated from the mathematical equations. More specifically, a code is generated in an Integrated Development Environment (IDE) using any of the known programming languages. In an example, the code is developed in Python. The python code is configured to build an optimum curve which relates the vibration spectrum peaks with the force. Furthermore, a mathematical relation is generated relating the force with the peaks. Further, the simulated impact force is determined for the group of bearings based on the output of the correlation model and the generated simulation operation profiles. More specifically, the simulated impact forces are predicted for the group of bearings by extracting peak values from the simulated operation profiles. Further, each peak value thus obtained from the experimental bearing setup is fit into the mathematical relation generated from the correlation model to obtain the prediction for the corresponding force during the test operation for the group of bearings.

Once the simulated impact force is determined, we further obtain the calibrated impact force by impact force analysis. In an embodiment, determining the impact force further comprises optimizing the one or more parameters in the determined calibrated impact force for the group of bearings using a machine learning model. In the calibrated impact force equation, Hertzian contact theory is used as the fundamental constant in the equation. Accordingly, the maximum compression of the ball on its interaction with the defect in the race of the bearing or the impact force is obtained using Newtonian mechanics. The force can be calculated using the given mathematical relation (4):

$$F = kx^{3/2}p^n + ap^2 + bp + c$$

wherein,

F is the force excreted by the ball in the edge of the defect

X is the maximum displacement of the ball bearing on interaction with the defect edge P is the amplitude peak of the frequency spectrum obtained from the vibration signal of the bearing n, a, b, c are the equation constants that are optimized using the simulation data that is obtained from the virtual bearing model.

It should be noted that apart from the fundamental constant $(kx^{3/2})$, we also use other constant (n, a, b, c) along with multiple powers of the amplitude peaks obtained from the frequency spectrum of the vibration signal.

The mathematical data for calculating the maximum impact force or the maximum compression in a ball bearing is based on a mathematical model of a bearing. The mathematical model is of the form:

$$p_1 \frac{k_c}{m_b} x_{imax}^{5/2} - p_2 \frac{Q_\varphi}{m_b} \cos\left(\frac{\theta_b}{2}\right) x_{imax} = (r_b \omega_f \sin\theta_b)^2 \tag{5}$$

which can be rearranged as:

$$p_1 \frac{k_c}{m_b} x_{imax}^5 - \left[ p_2 \frac{Q_\varphi}{m_b} \cos\left(\frac{\theta_b}{2}\right) \right]^2 x_{imax}^2 - \tag{6}$$

$$2(r_b \omega_f \sin\theta_b)^2 \left[ p_2 \frac{Q_\varphi}{m_b} \cos\left(\frac{\theta_b}{2}\right) \right] x_{imax} - (r_b \omega_f \sin\theta_b)^4 = 0$$

where, $x_{imax}$ is a maximum deflection of the ball in mm;

$$k_c = 4E_{eq}^2 \frac{\sqrt{r_{eq}}}{3} \tag{7}$$

$$E_{eq} = \frac{E}{1 - v^2} \tag{8}$$

where v is Poisson's ratio associated with a material of the bearing, E is Young's modulus associated with material and $E_{eq}$ is equivalent stiffness of the material. For example, if the bearing is made of EN31 steel, the Poisson's ratio is 0.3 and Young's modulus is 210 Gpa.

$$r_{eq} = 0.5098 * r_{ball} \tag{9}$$

where $r_{ball}$ is the radius of the ball $$Q_\varphi = \text{Load} * 4.37 \tag{10}$$

$$\theta_b = \sin^{-1} \frac{\text{defect size}}{2r_{ball}} \tag{11}$$

$$\theta_a = \sin^{-1} \frac{\text{defect size}}{2r_{bearing}} \tag{12}$$

where $r_{bearing}$ is a radius of the bearing given by:

$$r_{bearing} = d_m + \text{internal clearance}/2 \tag{13}$$

-continued $$\omega_f = \sqrt[2]{\frac{10 Q_\varphi (\theta_b - \theta_a) \sin\frac{\theta_b}{2}}{7} + \omega_2} \tag{14}$$

where ω is angular velocity is the angular frequency with which the ball rotates about the edge of the defect.

In the above equation, parameters p1 and p2 are tuned based on the bearing parameters. In an embodiment, the parameters are tuned using a trained machine learning model. The trained machine learning model is an evolutionary algorithm. Similarly, the parameters p1 and p2 are obtained for the three bearings.

In an embodiment, determining the impact force further comprises determining dynamic parameter for the at least one bearing based on the one or more parameters determined for each of the bearings in the group of bearings. The dynamic parameter is calculated for the at least one bearing for which the defect is analyzed in real-time. In an example, the ball radius is used as the normalizing scale in the bearing. That is, the parameters are related as a linear function of the ball diameter. Further, this relation is used to calculate the bearing parameter for any arbitrarily shaped bearing. It will be appreciated that this helps us in calculating the required bearing parameters for any arbitrary shaped bearing for which the remaining useful life needs to be predicted.

Further, the impact force F on the ball is calculated from $x_{imax}$ according to the following equation (4):

$$F = kx^{3/2}p^n + ap^2 + bp + c)$$

Here F represents the value of maximum impact force on the ball calculated mathematically. The maximum impact force is thus computed for the bearing for which the remaining useful life is to be calculated.

At step 530, a remaining useful life of the bearing is determined based on the determined impact force and the operational data based on the determined one or more frequencies. In an example, the remaining useful life may be expressed as number of revolutions before the failure occurs. In another example, the remaining useful life is expressed as number of operating hours at a constant speed before the failure. In an embodiment, the remaining useful life model for the bearing is configured based on the following rating life model:

$$L_{RUL} = a_1 a_{iso} \left(\frac{C_a}{P_a}\right)^3 \tag{15}$$

where, $a_{iso}$ is a life modification factor based on systems approach for life calculation Oven by:

$$a_{iso} = f\left(\frac{e_c C_u}{P_a}, K\right) \tag{16}$$

where, $a_1$ is a life modification factor for reliability, $C_u$ is fatigue load limit in Newtons, $e_c$ is a contamination factor specific to the defect size, $P_a$ is dynamic equivalent reference axial load in Newtons, $C_a$ is basic dynamic equivalent axial load rating, K is viscosity ratio.

Therefore, the remaining useful life is a function of the dynamic equivalent load acting on the bearing $P_a$ as shown:

$$L_{RUL} = a_1 f\left(\frac{e_c C_u}{P_a}, K\right)\left(\frac{c_a}{P_a}\right)^3 \tag{17}$$

Here, the dynamic parameter used for configuring the rating life model is the dynamic equivalent radial load.

The life modification factor for reliability is a predefined value specified in ISO 281:2007 for a given value of reliability. For example, if the reliability may be considered to be 90%, a1 is taken as 1. The value of reliability is taken as 90% by default. In an embodiment of the present disclosure, the value of reliability may be modified by an operator through the client device. The life modification factor for reliability may be further obtained from a first lookup table stored in the database 195, based on the value of reliability. The fatigue load limit and the dynamic equivalent radial load rating are obtained from the one or more bearing parameters associated with the bearing.

The contamination factor is determined based on the defect size. This is because, defects in the bearing result in removal of small, discrete particles of material from the structure of the bearing. These discrete particles increase the concentration of contaminants inside the bearing. The con-centration of contaminations further increases with increase in the defect size. The defect size is provided as input to a trained classification model that classifies the defect size into one of a plurality of severity levels. For example, the plurality of severity levels may correspond to 'normal cleanliness', 'slight to typical contamination', 'severe con-tamination' and 'very severe contamination'. Based on the defect size, the trained classification model outputs a sever-ity level. The severity level thus determined is further used to select an appropriate contamination factor from a second lookup table stored in the database 195. The second lookup table may comprise values of contamination factor corre-sponding to each of the severity levels. It must be under-stood by a person skilled in the conventional art that the classification model may be trained to classify the defect size into one of any number of severity levels.

The viscosity ratio is indicative of a lubrication condition of the bearing during operation. The viscosity ratio is calculated as the ratio of an operating viscosity of the lubricant to a rated viscosity of the lubricant. The operating viscosity is calculated based on a viscosity grade of the lubricant and an operating temperature. The viscosity grade of the oil may be obtained from a third look up table comprising viscosity grades corresponding to different types of lubricants. In one embodiment, the operating temperature of the bearing may be obtained from temperature sensors associated with the bearing. In another embodiment, a virtual model of the bearing may be used to determine a thermal profile of the bearing based on the sensor data. The rated viscosity is obtained from a fourth look up table based on dimensions of the bearing and angular velocity of the bearing. The equation (17) for rating life is as below:

$$L_{RUL} = a_1 f\left(\frac{e_c C_u}{P_a}, K\right)\left(\frac{C_a}{P_a}\right)^3$$

Here, the dynamic equivalent radial load P is the same as the impact force computed by the virtual model based on the sensor data. Therefore, the remaining useful life is a function of the determined impact force.

Therefore, the remaining useful life model is configured as below:

$$L_{RUL} = \tag{18}$$

$$a_1 f\left(\frac{e_c C_u}{F = kx^{\frac{3}{2}} p^n + ap^2 + bp + c}, K\right)\left(\frac{C_a}{F = kx^{\frac{3}{2}} p^n + ap^2 + bp + c}\right)^3$$

Based on the equation (18), the remaining useful life (RUL) of the bearing is calculated.

Figure 8:
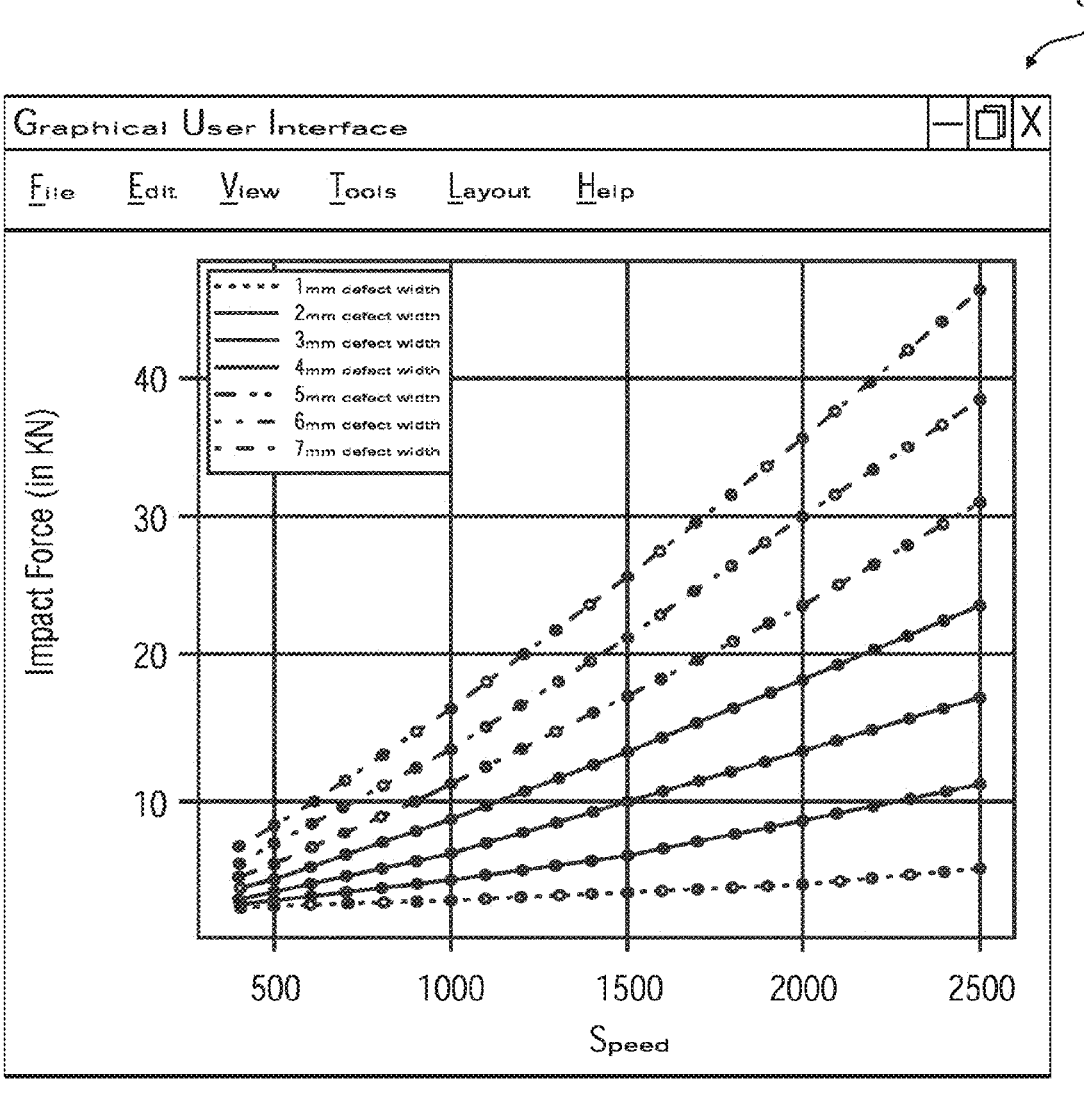
FIG. 8 is a Graphical User Interface view showing an example of impact force and speed curve, in accordance with an embodiment of the present invention.
Figure 9A:
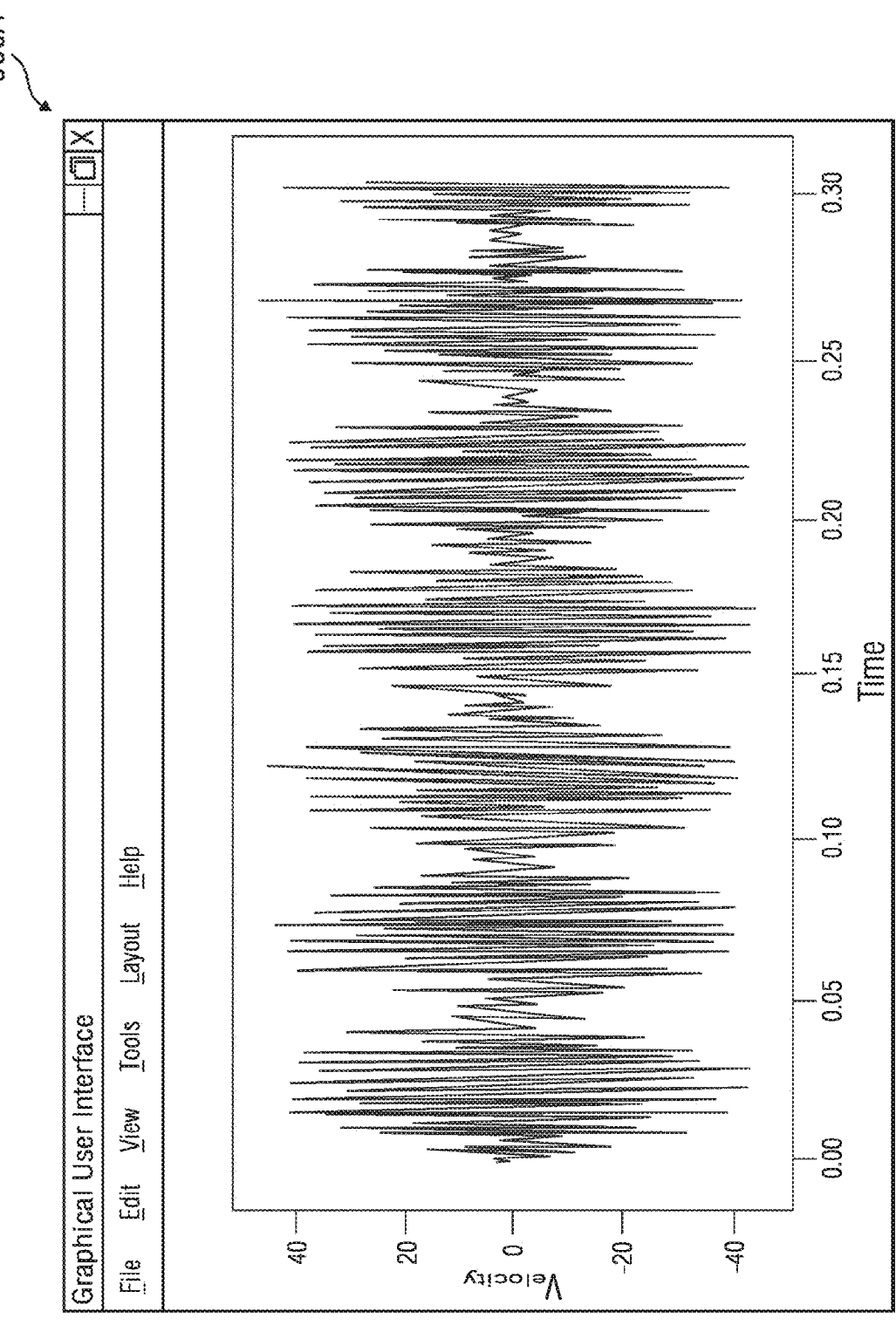
FIG. 9A is a Graphical User Interface view showing an example of ball velocity as obtained from operational data in time domain, in accordance with an embodiment of the present invention.
Figure 9B:
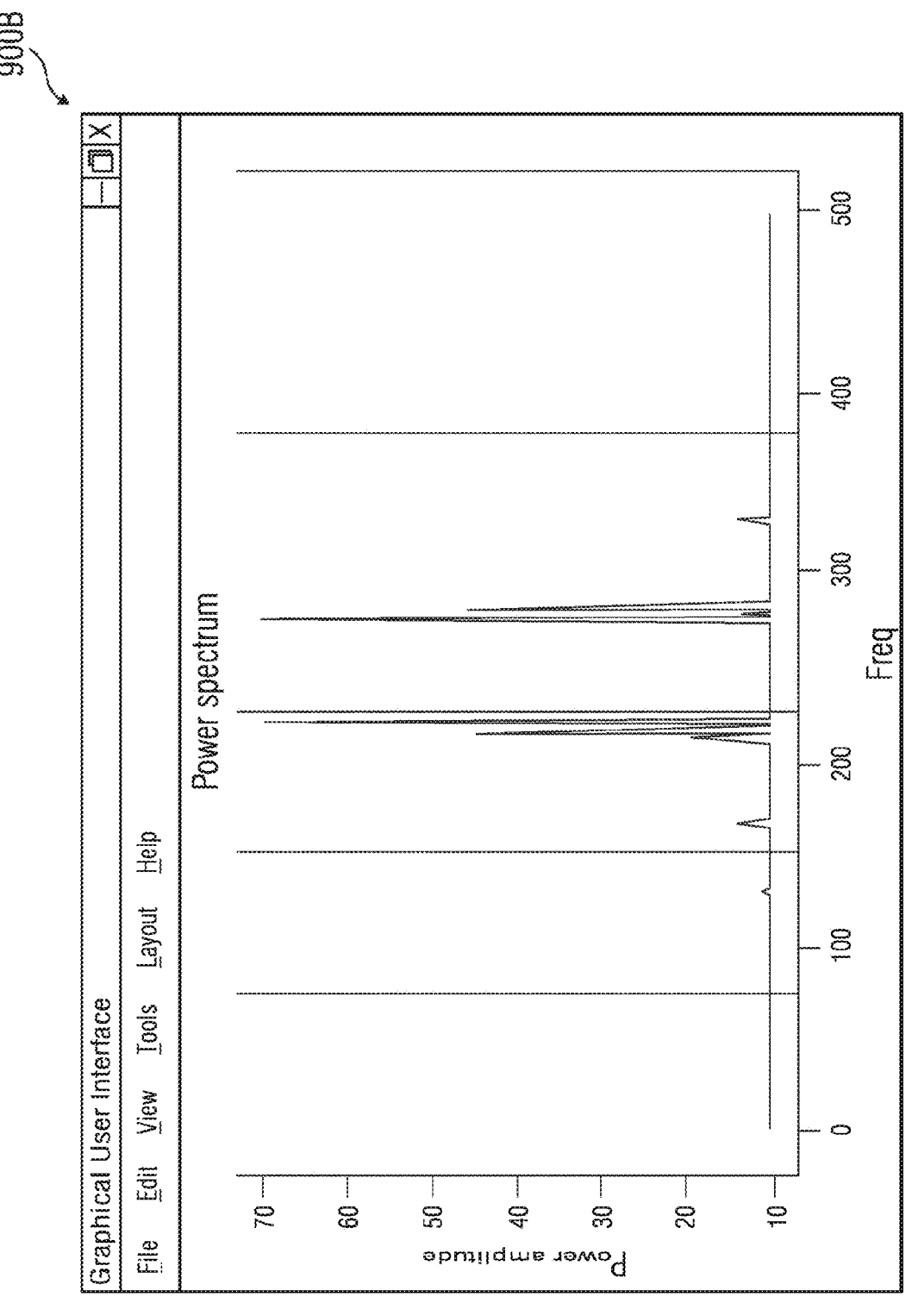
FIG. 9B is a Graphical User Interface view showing an example of power spectrum in frequency domain, in accordance with an embodiment of the present invention.
Figure 10:
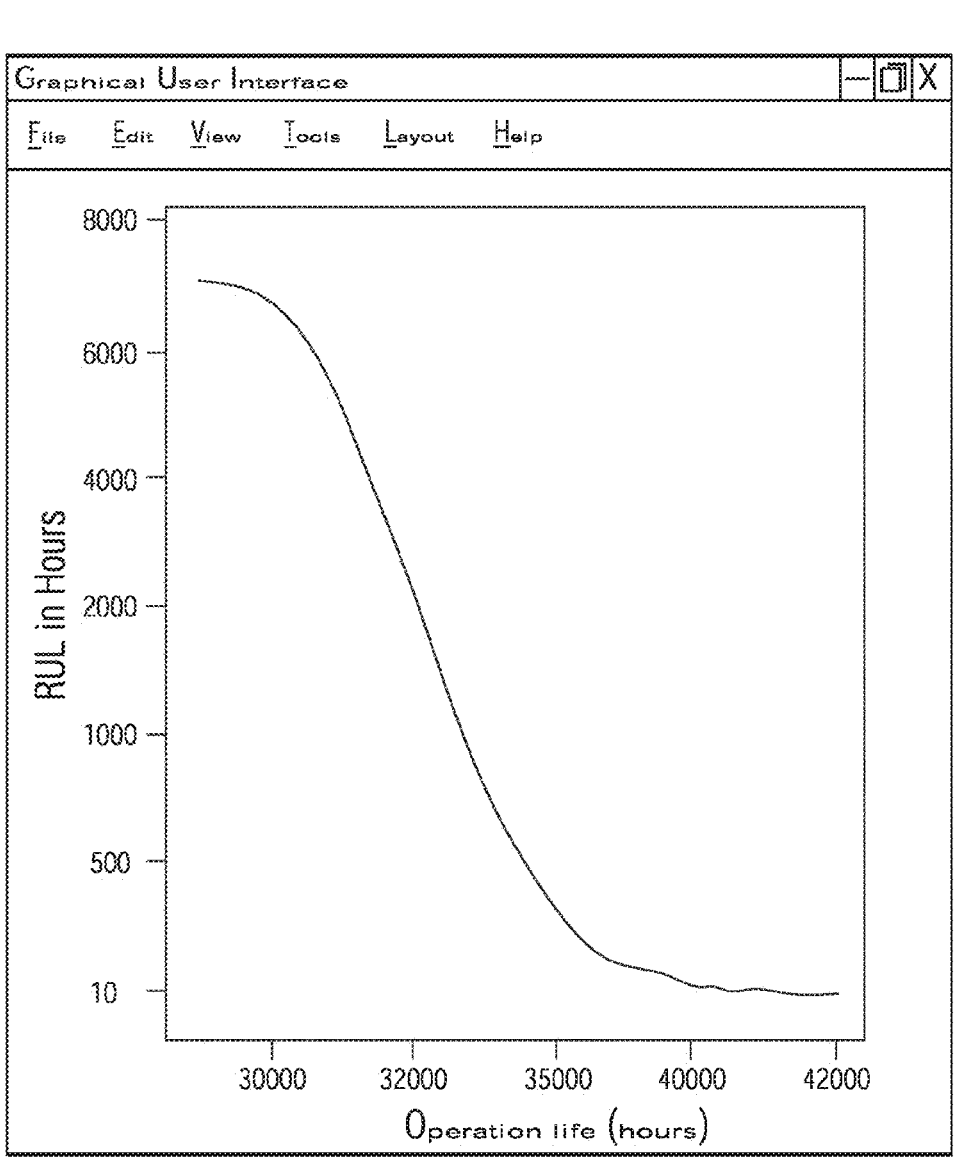
FIG. 10 is a Graphical User Interface view showing degradation in remaining useful life, in accordance with an embodiment of the present disclosure.

At step 535, a notification indicating the remaining useful life of the bearing is generated on an output device. The output may be a notification that indicates the remaining useful life of the bearing as a dynamically changing param-eter, based on real-time sensor data. For example, the notification may include a message 'The remaining useful life of bearing 6319 is 56 hours'. Furthermore, the output may also include values of peak amplitude values, force values, and remaining useful life as shown in FIG. 7. FIG. 7 is a GUI view 700 showing the peak amplitude values of the operation data received from the at least one bearing, the force exerted on the ball due to the defect, and the remaining useful life of the bearing in hours. The output may also include the impact force curve as shown in FIG. 8. FIG. 8 is a Graphical User Interface view 800 showing an example of impact force and speed curve, in accordance with an embodiment of the present invention. The GUI view 800 depicts the relationship between the impact force on the bearing and the ball velocity for various defect sizes. Fur-thermore, the output may also include the operational data as represented in time domain and frequency domain. FIG. 9A is a Graphical User Interface view 900A showing an example of ball velocity as obtained from operational data in time domain, in accordance with an embodiment of the present invention. FIG. 9B is a Graphical User Interface view 900B showing an example of power spectrum in frequency domain, in accordance with an embodiment of the present invention. Furthermore, the output may also include the RUL value further indicated on an RUL curve as shown in FIG. 10. FIG. 10 is a GUI view 1000 showing degradation in remaining useful life (shown as predicted life in hours), in accordance with an embodiment of the present disclosure. As may be seen from the curve, the RUL curve starts with potential failure in the at least one bearing and propagates till functional failure based on the vibration spectrum analysis, for example increase in velocity.

Embodiments of the present invention facilitate accurate calculation of remaining useful life of a bearing based on the impact force computed from vibration spectrum of the real time signals from the sensing unit 315 associated with the at least one bearing. Embodiments of the present invention continuously monitor the real time operation data obtained from the bearing, coverts it into frequency domain and accurately determine the remaining useful life of the bearing based on the relationship between impact force and the frequency spectrum signal determined from the operation data of the bearing in real-time.

Embodiments of the present invention are not limited to a particular computer system platform, processing unit, operating system, or network. One or more aspects of embodiments of the present invention may be distributed among one or more computer systems, for example, servers configured to provide one or more services to one or more client computers, or to perform a complete task in a distrib-uted system. For example, one or more aspects of embodi-ments of the present invention may be performed on a client-server system that comprises components distributed among one or more server systems that perform multiple functions according to various embodiments. These components comprise, for example, executable, intermediate, or interpreted code, which communicate over a network using a communication protocol. Embodiments of the present invention are not limited to be executable on any particular system or group of system, and is not limited to any particular distributed architecture, network, or communication protocol.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for estimating remaining useful life of at least one bearing, the method comprising:
 receiving, by a processing unit, a request for analyzing a defect in the bearing from a source, wherein the request includes operational data associated with the bearing,
 determining vibration spectrum of the at least one bearing from the received operational data;
 monitoring an impact of the defect on the at least one bearing over a period of time based on the determined frequency spectrum;
 determining one or more characteristic values from the vibration spectrum for which the impact of the defect on the bearing is above a threshold range;
 determining an impact force during an operation of the at least one bearing based on the determined one or more characteristic values and one or more parameters obtained from a virtual bearing model;
 determining a remaining useful life of the bearing based on the determined impact force during the time period; and
 generating a notification indicating the remaining useful life of the bearing on an output device.

2. The method according to claim 1, wherein the operational data further comprises an output of at least one sensing unit associated with the bearing in real-time.

3. The method according to claim 1, wherein monitoring the impact of the defect on the bearing over a period of time further comprises monitoring anomalies in the output of the at least one sensing unit.

4. The method according to claim 1, wherein determining an impact force during an operation of the at least one bearing based on the determined one or more characteristic values and one or more parameters obtained from a virtual bearing model further comprises generating the virtual bearing model for a group of bearings comparable with the at least one bearing.

5. The method according to claim 1, wherein the virtual bearing model is generated based on one or more of simulation data, experimental data and mathematical data associated with the group of bearings.

6. The method according to claim 1, wherein generating the virtual bearing model further comprises:
 determining test operation profiles based on test operation data associated with the group of bearings;
 simulating the predetermined defects on a predefined bearing model comprising dataset pursuant to dynamic load rating standards and rating life standards associated with the group of bearings; and
 generating simulated operation profiles in frequency domain associated with the group of bearings based on the simulation of the predetermined defects on the predefined bearing model.

7. The method according to claim 1, wherein determining an impact force during an operation of the at least one bearing further comprises:
 determining calibrated impact force for the group of bearings based on a correlation model obtained from vibration spectrum of simulation vibration signals and the generated simulated operation profiles in frequency domain associated with the group of bearings.

8. The method according to claim 1, wherein determining an impact force during an operation of the at least one bearing further comprises:
 optimizing the one or more parameters in the determined calibrated impact force for the group of bearings using a machine learning model.

9. The method according to claim 1, wherein determining an impact force during an operation of the at least one bearing further comprises:
 determining parameters for the at least one bearing based on the one or more parameters determined for each of the bearings in the group of bearings.

10. The method according to claim 1, wherein determining the remaining useful life of the at least one bearing based on the determined impact force during the time period further comprises:
 configuring a remaining useful life model of the at least one bearing based on the determined parameter and contamination and/or lubrication effect; and
 computing the remaining useful life of the at least one bearing based on the configured remaining useful life model and the operational data.

11. An apparatus for estimating remaining useful life of at least one bearing, the apparatus comprising:
 one or more processing units; and
 a memory unit communicatively coupled to the one or more processing units), wherein the memory unit comprises a bearing management module stored in the form of machine-readable instructions executable by the one or more processing units, wherein the bearing management module is configured to perform the method according to claim 1.

12. A system for estimating remaining useful life of a bearing, the system comprising:
 one or more sources configured for providing operational data associated with the bearing; and
 an apparatus according to claim 11, communicatively coupled to the one or more sources, wherein the apparatus is configured for estimating remaining useful life of the bearing based on the operational data.

13. A computer-program product having machine-readable instructions stored therein, which when executed by one or more processing units, cause the processing units to perform a method according to claim 1.

14. A non-transitory computer-readable storage medium comprising instructions which, when executed by a data-processing system, causes the data-processing system to perform a method according to claim 1.

* * * * *